June 19, 1951          J. W. PACKIE          2,557,682
CONDENSING VAPOR STREAMS
Filed Feb. 21, 1945
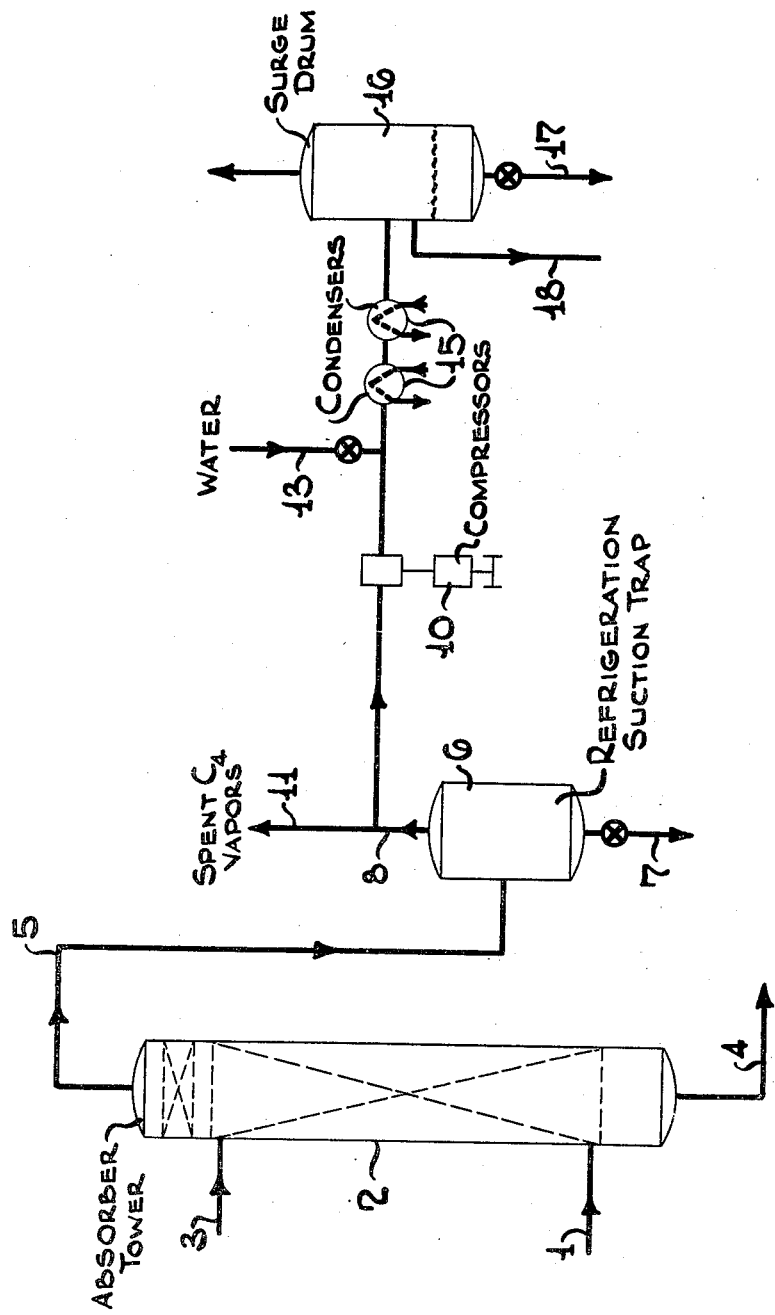
John W. Packie     Inventor
By    Young   Attorney Patented June 19, 1951

2,557,682

UNITED STATES PATENT OFFICE 2,557,682

CONDENSING VAPOR STREAMS

John W. Packie, Green Village, N. J., assignor to Standard Oil Development Company, a corporation of Delaware Application February 21, 1945, Serial No. 579,070

5 Claims. (Cl. 183—115)

The present application relates to a process for condensing vapor streams and relates more particularly to the condensation of vapor streams containing a plurality of components of varying vapor pressures.

When condensing any vapor stream having components varying widely in their vapor pressures it is necessary to adjust the conditions of temperature and pressure to suit the most volatile component of the mixture in order to condense the entire stream. In such mixtures, it is often possible to remove some of the components by absorption in liquid solvents. When the soluble component possesses the higher vapor pressure this component is usually stripped from the stream prior to the condensation, if it is not desired in the final condensate. Such a vapor stream may be, for example, a mixture of hydrocarbons and ammonia such as obtained in the manufacture of coal gas. A similar situation occurs in the purification of butadiene by selective extraction from a $C_4$ stream with cuprous ammonium acetate. Vapors in equilibrium with this solvent consist mainly of $C_4$ hydrocarbons, ammonia and water in the ratio of their vapor pressures at the operating temperature. In order to completely condense such a stream it is obviously necessary to employ sufficient pressure at the operating temperature to equal or exceed the vapor pressure of the condensate. Thus relatively high pressures or low temperatures are required to liquefy a $C_4$ vapor stream containing appreciable quantities of ammonia as compared with the conditions required to condense a pure $C_4$ vapor stream.

In the past, it has been customary to remove the ammonia in the vapor phase by scrubbing with water prior to condensation. However, this necessitates the use of a vapor phase water scrubber and the use of rather large quantities of water.

It is, therefore, the main object of this invention to provide a process for the more economical removal of a component having relatively high vapor pressure from a vapor stream containing it.

It is a further object of this invention to reduce the load on an ammonia recovery system by providing a process for ammonia removal from a hydrocarbon vapor stream containing it in which considerably less water is used for dissolving the ammonia.

It is a further object of this invention to eliminate the vapor phase water scrubber tower heretofore used in recovering ammonia from a hydrocarbon vapor stream containing it.

Broadly the objects of this invention are accomplished by condensing the vapor stream in the presence of a solvent for the component having the higher vapor pressure.

Since this invention is particularly applicable to the separation of ammonia from hydrocarbon streams it will be described in connection with the absorption of butadiene in cuprous ammonium acetate solutions but this is not to be considered as limiting the invention but as being merely illustrative thereof.

Referring to the drawing, numeral 1 denotes a pipe through which is passed a $C_4$ cut containing butadiene, acetylenes, butenes, allenes, etc. This mixture is passed through pipe 1 into absorber 2 where a temperature of about 0°–70° F., preferably 20°–40° F. is maintained. The hydrocarbon mixture in absorber 2 passes in countercurrent flow to an ammoniacal cuprous acetate solution introduced by pipe 3. The ammoniacal cuprous acetate solution absorbs butadiene from the $C_4$ fraction and the rich solution is removed from absorber 2 by line 4. Spent $C_4$ hydrocarbons containing ammonia from the cuprous ammonium acetate solvent are removed overhead from absorber 2 through line 5 and passed to suction trap 6 where they are maintained at about the same temperature as that in the top of the absorber 2, that is at about 30°–60° F. Any liquid dropping out in the suction trap is removed through line 7. Spent $C_4$ vapors free from liquid are removed from the suction trap by line 8 and passed by line 9 to compressor 10. If it be desired to remove any of the spent $C_4$ fraction as product without condensation, this portion may be removed from trap 6 by line 11. Compressor 10 imposes a pressure of 60–80 lbs. gage onto the spent $C_4$ vapors. Leaving the compressor 10 through line 12, the $C_4$ vapor stream is met by a stream of water introduced through line 13. The amount of water added at this point is relatively small, the amount being sufficient only to dissolve all the ammonia in the stream. The steam of $C_4$ vapors and water are then passed by line 14 to condensers 15. These condensers are cooled by water and are maintained at a temperature from 100°–120° F. where the hydrocarbons in the $C_4$ vapor stream are all condensed at the prevailing pressure of 60–80# gage. However, if no water had been added it would be necessary to cool the stream to 30°–60° F. in order to condense the hydrocarbons. The condensed stream is then passed to surge drum 16 where the ammoniacal solution separates as a lower layer and is withdrawn through line 17. Liquefied C₄ hydrocarbons, mostly butenes and butanes, are withdrawn through line 18.

Although the present invention has been described with a certain degree of particularity, it is to be understood that the present disclosure has been made by way of illustration only and that numerous changes in the details of construction and the combination and arrangement of parts may be resorted to without departing from the spirit and scope of the invention as hereinafter claimed. For example, instead of adding water to the spent C₄ stream after compressing, a small amount of ammoniacal cuprous acetate solution may be added instead. In short, any solvent for ammonia which will not also dissolve the hydrocarbons may also be used. Also instead of compressing the vapors from the absorber 2 they could be conducted directly to the condenser at atmospheric pressure and a low temperature cooling medium used such as ammonia at a temperature of 0° to 20° F.

The nature and objects of the present invention having thus been set forth and a specific illustration of the same given, what is claimed as new and useful and desired to be secured by Letters Patent is:

1. A process for condensing a hydrocarbon fraction consisting of C₄ and higher boiling hydrocarbons from a vapor stream containing said fraction in a mixture with ammonia vapor, in which the ammonia is present in sufficient concentration materially to increase the total vapor pressure of said stream, comprising compressing said stream to a pressure of from 60 to 80 pounds gauge per square inch, injecting water into said stream in an amount sufficient to dissolve substantially all of the ammonia present therein, condensing the C₄ and higher boiling hydrocarbon fraction in the presence of said liquid solvent for ammonia at a temperature of from about 100° to 120° F., forming a liquid ammoniacal solution and a hydrocarbon condensate, and separating said liquid solution and condensate.

2. A process for condensing a hydrocarbon fraction consisting of C₄ and higher boiling hydrocarbons from a vapor stream, containing said fraction in a mixture with ammonia vapor, in which the ammonia is present in sufficient concentration materially to increase the total vapor pressure of said stream, comprising injecting into the said vapor stream a liquid solvent for the ammonia component thereof in an amount sufficient to dissolve substantially all of the ammonia present in said stream, condensing the C₄ and higher boiling hydrocarbon fraction in the presence of said liquid solvent for ammonia at a pressure substantially equal to the vapor pressure of said hydrocarbon fraction alone at the condensing temperature, forming a liquid ammoniacal solution and a hydrocarbon condensate, and separating said liquid solution and condensate.

3. A process according to claim 2, in which the liquid solvent for ammonia is an aqueous solvent material.

4. A process according to claim 2 in which the liquid solvent for ammonia is water.

5. A process according to claim 2 in which the liquid solvent for ammonia is cuprous ammonium acetate.

JOHN W. PACKIE.

REFERENCES CITED

The following references are of record in the file of this patent:

UNITED STATES PATENTS

| Number | Name | Date |
| --- | --- | --- |
| 1,213,795 | Felt | Jan. 23, 1917 |
| 1,213,796 | Felt | Jan. 23, 1917 |
| 1,237,767 | Felt | Aug. 21, 1917 |
| 1,893,733 | Deanesly | Jan. 10, 1933 |
| 2,242,173 | Buckley | May 13, 1941 |
| 2,306,553 | Miller | Dec. 29, 1942 |
| 2,364,660 | Reid | Dec. 12, 1944 |